United States Patent
Cherubini et al.

(10) Patent No.: US 11,200,484 B2
(45) Date of Patent: Dec. 14, 2021

(54) PROBABILITY PROPAGATION OVER FACTOR GRAPHS

(71) Applicant: International Business Machines Corporation, Armonk, NY (US)

(72) Inventors: Giovanni Cherubini, Rueschlikon (CH); Timoleon Moraitis, Glattpark (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 16/123,940

(22) Filed: Sep. 6, 2018

(65) Prior Publication Data

US 2020/0082251 A1    Mar. 12, 2020

(51) Int. Cl.
*G06N 3/04* (2006.01)
*G06N 3/08* (2006.01)

(52) U.S. Cl.
CPC .......... *G06N 3/0472* (2013.01); *G06N 3/049* (2013.01); *G06N 3/084* (2013.01)

(58) Field of Classification Search
CPC ....... G06N 3/0472; G06N 3/049; G06N 3/084
See application file for complete search history.

(56) References Cited

U.S. PATENT DOCUMENTS

| | | | | |
|---|---|---|---|---|
| 7,036,720 | B2* | 5/2006 | Mezard | G06F 17/10 235/375 |
| 8,140,930 | B1* | 3/2012 | Maru | H03M 13/1122 714/752 |
| 9,189,730 | B1 | 11/2015 | Coenen et al. | |
| 2003/0014717 | A1* | 1/2003 | Yedidia | H03M 13/37 714/804 |
| 2005/0193320 | A1* | 9/2005 | Varnica | H03M 13/3723 714/800 |

(Continued)

FOREIGN PATENT DOCUMENTS

| | | |
|---|---|---|
| CN | 105095966 A | 11/2015 |
| CN | 106997485 A | 8/2017 |

OTHER PUBLICATIONS

Rob Valkass, Intellectual Property Office, UK Examination Report, GB2103947.4, dated Apr. 12, 2021, pp. 1-7.
Alireza Bagheri et al. Training Probabilistic Spiking Neural Networks With First-to-Spike Decoding, Training Probabilistic Spiking Neural Networks with First-to-spike Decoding, Oct. 2017, 3 pages.
Nikola Kasabov, To Spike or Not to Spike: A Probabilistic Spiking Neuron Model, Neural Networks, vol. 23, Issue 1, Jan. 2010, pp. 16-19.

(Continued)

*Primary Examiner* — Paulinho E Smith
(74) *Attorney, Agent, or Firm* — Daniel Morris; Otterstedt, Wallace & Kammer, LLP (57) ABSTRACT

Methods and apparatus are provided for implementing propagation of probability distributions of random variables over a factor graph. Such a method includes providing a spiking neural network, having variable nodes interconnected with factor nodes, corresponding to the factor graph. Each of the nodes comprises a set of neurons configured to implement computational functionality of that node. The method further comprises generating, for each of a set of the random variables, at least one spike signal in which the probability of a possible value of that variable is encoded via the occurrence of spikes in the spike signal, and supplying the spike signals for the set of random variables as inputs to the neural network at respective variable nodes. The probability distributions are propagated via the occurrence of spikes in signals propagated through the neural network.

25 Claims, 7 Drawing Sheets

(56) References Cited

U.S. PATENT DOCUMENTS

| | | | |
|---|---|---|---|
| 2012/0197829 A1* | 8/2012 | Nori | G06N 7/005 |
| | | | 706/13 |
| 2013/0117209 A1 | 5/2013 | Aparin | |
| 2013/0204819 A1 | 8/2013 | Hunzinger et al. | |
| 2013/0304683 A1 | 11/2013 | Lo | |
| 2013/0325768 A1 | 12/2013 | Sinyavskiy et al. | |
| 2014/0081895 A1* | 3/2014 | Coenen | G06N 3/08 |
| | | | 706/25 |
| 2014/0143294 A1* | 5/2014 | Vitaly | G06F 16/244 |
| | | | 709/201 |
| 2014/0351190 A1 | 11/2014 | Levin et al. | |
| 2015/0278685 A1 | 10/2015 | Zheng et al. | |
| 2016/0110643 A1 | 4/2016 | Basu et al. | |

OTHER PUBLICATIONS

Sengupta, Abhronil, et al. "Probabilistic deep spiking neural systems enabled by magnetic tunnel junction" IEEE Transactions on Electron Devices 63.7 (2016): 2963-2970.

Maruan Al-Shedivat et al., . Inherently Stochastic Spiking Neurons for Probabilistic Neural Computation, 7th Annual International IEEE EMBS Conference on Neural Engineering, Apr. 2015, pp. 356-359.

Giovanni Cherubini et al., unpublished U.S. Appl. No. 16/015,897, filed Jun. 22, 2018, Managing Datasets of a Cognitive Storage System With a Spiking Neural Network, pp. 1-26 plus 5 sheets of drawings.

ISA/CN PCT International Search Report and Written Opinion, PCT International Patent Application No. PCT/IB2019/057472, dated Dec. 20, 2019, pp. 1-10.

* cited by examiner

| Input Patterns (spike time (ms)) | | Output Patterns (spike time (ms)) |
|---|---|---|
| 0 | 0 | 10 |
| 0 | 6 | 16 |
| 6 | 0 | 16 |
| 6 | 6 | 10 |

Figure 15

PROBABILITY PROPAGATION OVER FACTOR GRAPHS

BACKGROUND

The present invention relates generally to probability propagation over factor graphs. In particular, methods are provided for implementing propagation of probability distributions of random variables over a factor graph, together with apparatus and computer program products for performing such methods.

Propagating probability distributions of random variables over a factor graph is a probabilistic computing technique used in numerous applications in science and technology. By way of example, the technique can be used for statistical inference in applications such as decoding of error-correction codes in data transmission, dataset analysis to derive insights from large quantities of data, e.g. from the Internet, and development of personalized health care programs for optimal combination of competing therapies involving genetic factors in patients. The technique is applied to probability distributions of a group of random variables whose values represent possible outcomes of a physical process or other essentially random phenomenon according to the particular application in question. These probability distributions are propagated over edges of a factor graph which has a plurality of variable nodes interconnected via edges with a plurality of factor nodes. The structure of this factor graph, and the particular computational functionality associated with nodes of the graph, is determined by the underlying application. The probability propagation process is explained briefly below with reference to FIGS. 1 and 2 of the accompanying drawings.

Figure 1:
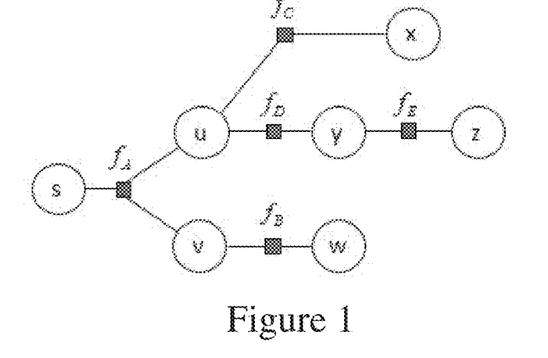
FIG. 1 shows an example of a factor graph.

FIG. 1 shows a simple example of a factor graph. This factor graph has variable nodes corresponding to a group of variables s, u, v, w, x, y and z, and factor nodes corresponding to functions $f_A$, $f_B$, $f_C$, $f_D$ and $f_E$, describing the factorization:

$$P(s,u,v,w,x,y,z) = f_A(s,u,v) f_B(v,w) f_C(u,x) f_D(u,y) f_E(y,z)$$

Edges in the graph connect variable nodes to factor nodes according to the factors in which the variables appear. Suppose it is desired to compute:

$$P(s \mid z = z') = P(s, z = z') \Big/ \sum_s P(s, z = z')$$

where $P(s|z=z')$ denotes the probability distribution of variable s given an observed value of z' for variable z. Two approaches may be used. Direct computation can be performed by summation over $n_u n_v n_w n_x n_y$ terms (where $n_p$ denotes the number of possible values of variable p):

$$P(s, z = z') = \sum_{u,v,w,x,y} P(s, u, v, w, x, y, z = z')$$

Alternatively, individual summations can be distributed across the products in the factorization (sum over $n_u n_v + n_w + n_x + n_y$ terms):

$$P(s, z = z') = \sum_{u,v} f_A(s,u,v) \left\{ \sum_w f_B(v,w) \right\} \left\{ \left[ \sum_x f_C(u,x) \right] \left[ \sum_y f_D(u,y) f_E(y, z = z') \right] \right\}$$

Figure 2:
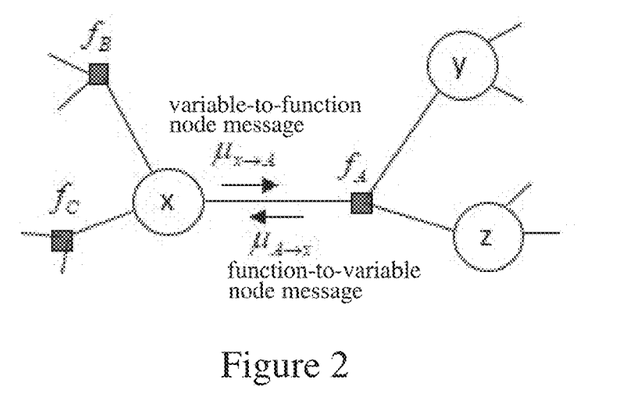
FIG. 2 illustrates message passing in a section of a factor graph.

The probability propagation process performs the second type of computation above by treating edges of a factor graph as message passing channels. Messages representing probability distributions are computed at the nodes and passed along edges to the connected nodes. In general, the orientation of a graph and the way in which messages are propagated depends on the particular computation to be performed, the messages being created in response to observations. The graph can be directed by selecting one or more nodes as a root, and each non-root node which is connected to only one other node is designated a leaf. Messages may be passed level-by-level forward from the leaves to the roots in a first step, and then level-by-level backward from the roots to the leaves in a second step. During each of the forward and backward passes, two types of vector messages are passed: variable-to-function messages consisting of products of local marginals; and function-to-variable messages consisting of sums of distributions over nearby variables. The computation of these two types messages at a variable node x and function node $f_A$ in the section of a factor graph shown in FIG. 2 is as follows. A variable-to-function message from x to $f_A$ is given by:

$$\mu_{x \to A}(x) = \mu_{B \to x}(x) \mu_{C \to x}(x)$$

and a function-to-variable messages from $f_A$ to x is given by:

$$\mu_{A \to x}(x) = \Sigma_y \Sigma_z f_A(x,y,z) \mu_{y \to A}(y) / \mu_{z \to A}(z).$$

During the two passes, the observed variables v, for which values are known, are kept constant at those values. Once both passes are complete, each node $z_i$ combines its stored messages to obtain $P(z_i|v)$. Hence, for variable node x in FIG. 2:

$$P(x|v) = \beta \mu_{A \to x}(x) \mu_{B \to x}(x) \mu_{C \to x}(x)$$

where $\beta$ is such that $\Sigma_x P(x|v) = 1$.

It will be seen that the probability propagation operation is computationally complex, and complexity increases dramatically for applications involving large numbers of random variables. Implementing probability propagation using conventional (von-Neumann) computers requires substantial processing resources and significant power consumption, and efficiency decreases markedly with increasing numbers of variables.

SUMMARY

According to at least one embodiment of the present invention there is provided a method for implementing propagation of probability distributions of random variables over a factor graph. The method includes providing a spiking neural network, having variable nodes interconnected with factor nodes, corresponding to the factor graph. Each of the nodes comprises a set of neurons configured to implement computational functionality of that node. The method further comprises generating, for each of a set of the random variables, at least one spike signal in which the probability of a possible value of that variable is encoded via the occurrence of spikes in the spike signal, and supplying the spike signals for the set of random variables as inputs to the neural network at respective variable nodes. The probability distributions are propagated via the occurrence of spikes in signals propagated through the neural network.

Implementing probability propagation in this manner using a spiking neural network offers significantly higher energy efficiency and lower implementation complexity than conventional von-Neumann computing architectures, allowing scalability to large numbers of random variables.

Probabilities may be encoded in the spike signals via at least one of the rate of occurrence and the time of occurrence of spikes in a spike signal. In the resulting signals propagated through the neural network by network nodes, the probability distributions may similarly be represented by spike rate and/or timing, and different representations may be used at different stages in propagation. In particularly simple and efficient embodiments, each spike signal is generated such that the probability is encoded via the rate of occurrence of spikes in the spike signal, and the neurons of the nodes are configured such that the probability distributions are propagated via the rate of occurrence of spikes in signals propagated through the neural network.

For binary random variables (having only two possible values), a single spike signal can be generated for each variable of said set. This signal encodes the probability of a predetermined one of the binary values of the variable. However, multivalued random variables (having three or more possible values) can be readily accommodated in the spiking neural network architecture. In this case, for each possible value of each random variable of said set, a spike signal encoding the probability of that value of the variable can be generated.

At least one further embodiment of the invention provides a method for detecting error-correction codewords, in a signal sampled at a channel output, by propagating probability distributions of codeword symbols corresponding to respective signal samples over a factor graph. The method includes providing a spiking neural network, having variable nodes interconnected with factor nodes, corresponding to a bipartite factor graph defined by a decoding algorithm of the error-correction code. Each of the nodes comprises a set of neurons configured to implement computational functionality of that node. The method further comprises generating, for each signal sample corresponding to a symbol of a codeword, at least one spike signal in which the probability of a possible symbol value for that sample is encoded via the occurrence of spikes in the spike signal, and supplying the spike signals corresponding to the symbols of a codeword as inputs to the neural network at respective variable nodes. The probability distributions are propagated via the occurrence of spikes in signals propagated through the neural network, and the variable nodes output estimated symbol values for the codeword after propagation.

Further embodiments of the invention provide apparatus for implementing a method described above, and computer program products for causing a processing apparatus to perform propagation of probability distributions by a method described above.

In general, where features are described herein with reference to a method embodying the invention, corresponding features may be provided in apparatus/computer program products embodying the invention, and vice versa.

Embodiments of the invention will be described in more detail below, by way of illustrative and non-limiting example, with reference to the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention implement probabilistic computing using a spiking neural network (SNN). An SNN is a neuromorphic processing architecture which is inspired by biological architectures of the nervous system where information is processed by a complex network of neurons interconnected via synapses. A biological neuron can integrate the input signals it receives. The neuron "membrane potential", which represents the stored neuron state, is progressively modified by the arrival of neuron input signals. When the membrane potential traverses a specific voltage threshold, the neuron will "fire", generating an output signal known as an "action potential" or "spike", and then revert to its initial state. These spikes are conveyed to other neurons via synapses which change their connection strength ("plasticity" or "synaptic weight") as a result of neuronal activity.

Computation in SNNs relies on all-or-none spike-based communication between a network of spiking neurons. The basic components of an SNN comprise functionality emulating neurons and synapses, with the neurons being interconnected via synapses which relay spikes between neurons in dependence on a stored synaptic weight. Neuron/synapse functionality can be implemented in hardware and/or software, with neurons emulating the "integrate-and-fire" functionality of biological neurons and synapses emulating the plasticity of biological synapses. Various circuit implementations for neurons and synapses are known in the art, including circuits which exploit memristive properties of nanodevices, e.g. resistive memory cells such as phase-change memory (PCM) cells, for storing neuron membrane potential or synaptic weight. Dense cross-bar arrays of such memristive devices offer massively parallel and highly area- and energy-efficient SNN implementations.

A simple neuron model is defined by a first-order differential equation:

$$\frac{dv}{dt} = \frac{v_\infty - v}{\tau}$$

where v denotes the membrane potential, $v_\infty$ the resting potential, and $\tau$ the time constant. The neuron fires a spike if the membrane potential achieves a threshold value $v_{th}$, and resets the membrane potential to $v_{reset}$. After firing a spike, the neuron is unresponsive to inputs for a refractory period equal to $T_{refract}$. Neurons are connected via synapses as described above. A synaptic connection between two neurons causes an instantaneous change equal to w in the membrane potential of the post-synaptic neuron after a spike is fired by the pre-synaptic neuron. The magnitude of the change w thus reflects the synaptic weight.

Figure 3:
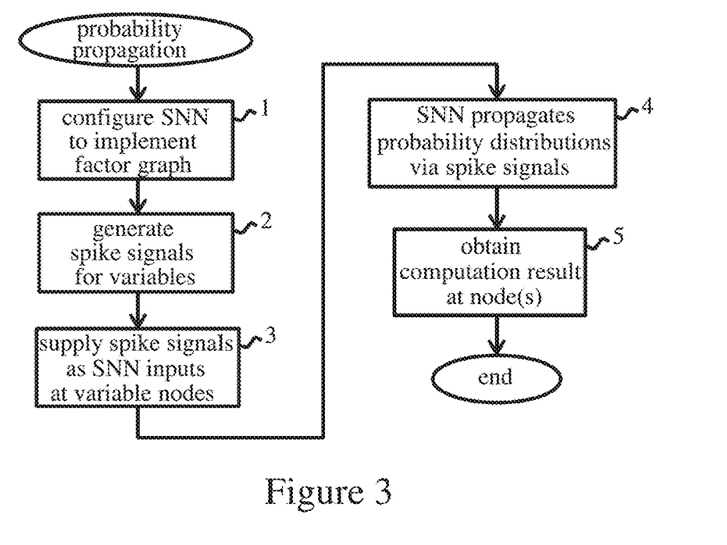
FIG. 3 indicates steps of a method embodying the invention implementing propagation of probability distributions over a factor graph.

Methods embodying the invention use an SNN architecture to implement propagation of probability distributions of random variables over a factor graph. Basic steps of such a method are indicated in the flow diagram of FIG. 3. As indicated at step 1, an SNN is provided with variable nodes interconnected with factor nodes (also referred to as function nodes) corresponding to a factor graph defined by the application in question. The SNN will contain a plurality of variable nodes corresponding to respective random variables of the plurality of variables for which computation is to be performed. The possible values of these variables may represent possible outcomes of a physical process, for example possible symbol values corresponding to samples of an encoded data transmission, or possible gene expression data resulting from therapeutic treatment of genetic disease. As another example, values of variables may represent relevance of data sets in large data storage systems. (Numerous other applications can be envisaged here, and the particular nature of the random variables is orthogonal to the operating principles described herein). The variable nodes are interconnected with the factor nodes according to edges of the factor graph. Each of the variable and factor nodes in the SNN comprises a set of (one or more) neurons configured to implement computational functionality of that node in the probability propagation operation. The configuration of neurons implementing variable nodes will depend, for example, on the number of edges connecting that node to neighboring factor nodes in the graph. The configuration of neurons implementing factor nodes will depend, for example, on the number of edges to neighboring variable nodes and the computational function associated with the factor node as determined by the underlying application.

To initiate the propagation operation, at least one spike signal is generated for each random variable of a set of (one or more of) the random variables corresponding to variable nodes of the graph. This set of variables for which spike signals are generated may comprise, for example, observed variables (i.e. variables for which values have been observed), and/or unobserved variables for which an "a priori" probability distribution is available. Generation of the spike signals for random variables is indicated at step 2 of FIG. 3. In each spike signal, the probability of a possible value of the corresponding variable is encoded via the occurrence of spikes in the spike signal. The number of spike signals generated for a variable thus depends on the number of possible values of the variable. (In general, each possible value here may represent a value of a discrete random variable taken from a finite alphabet (for discrete random variables) or a value range, i.e. any value within a defined range, (for continuous random variables)). In step 3, the spike signals for the random variables are supplied as inputs to the SNN at the respective variable nodes corresponding to those random variables. In step 4, the probability distributions of the random variables are then propagated via the occurrence of spikes in signals propagated through the SNN. The propagation process may involve more than one propagation step and may be iterative, involving a plurality of propagation operations each of which may comprise a plurality of propagation steps, e.g. forward (leaf-to-root) and backward (root-to-leaf) propagation steps as described earlier. During the propagation operation, variable nodes compute the variable-to-function messages (product terms) of the message passing operation, and the factor nodes compute the function-to-variable messages (sums of products), with the computational results in each case being encoded in the occurrence of spikes in signals output by the neurons implementing each node. The results of propagation are provided by the computations performed at SNN nodes, and a desired computational result can be obtained at one or more nodes after propagation as indicated at step 5. In particular, a desired result of the propagation operation can be obtained from signals at one or more nodes, e.g. via node outputs, according to the particular computational result to be inferred from the operation. For example, one or more variable nodes may be adapted to output spike signals encoding the propagation results at those nodes. Results may be obtained at one or more stages of an iterative process in which the computational results are progressively refined by successive passes of a propagation operation.

The probability distributions of the random variables are thus propagated via the occurrence of spikes in signals propagated through the SNN to obtain a computational result at one or more nodes after propagation. This use of an SNN to evaluate probability propagation over factor graphs allows the inherently complex operation to be performed in a highly efficient manner, offering significantly higher energy efficiency and lower implementation complexity compared to conventional implementations based on von Neumann computing architectures. SNN architectures for probability propagation thus offer scalability to a large number of random variables.

Exemplary embodiments, in which an SNN architecture is employed for probability propagation in decoding of error-correction codes, will now be described in more detail. In this application, the above method is used for detecting error-correction codewords in a signal sampled at a channel output. A signal transmitted over a channel is modulated with symbols of codewords produced by encoding data using an error-correction code (ECC). The signal is sampled at the channel output to obtain signal samples corresponding to respective symbols of each ECC codeword. The SNN architecture is employed to propagate probability distributions of codeword symbols corresponding to respective signal samples over a bipartite factor graph defined by a decoding algorithm of the error-correction code. In this example, the ECC code is a (7, 4) Hamming code and the decoding algorithm is defined by the following parity check matrix H:

$$H = \begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix}$$

The parity-check equation for a codeword b, with symbols $b_1, b_2, \ldots, b_7$, is $Hb=0$. For binary antipodal signaling over an AWGN (additive white Gaussian noise) channel, the symbol probabilities at the channel output are:

$$p_n^0 = \frac{1}{1+e^{2x_n/\sigma^2}} \text{ and } p_n^1 = \frac{1}{1+e^{-2x_n/\sigma^2}}$$

where: $x_n$ is a signal sample corresponding to a codeword symbol $b_n$ (n=1 to 7); $p_n^0$ is the probability that sample $x_n$ corresponds to $b_n=0$; $p_n^1$ is the probability that sample $x_n$ corresponds to $b_n=1$; and $\sigma$ is the standard deviation of the additive noise.

Figure 4:
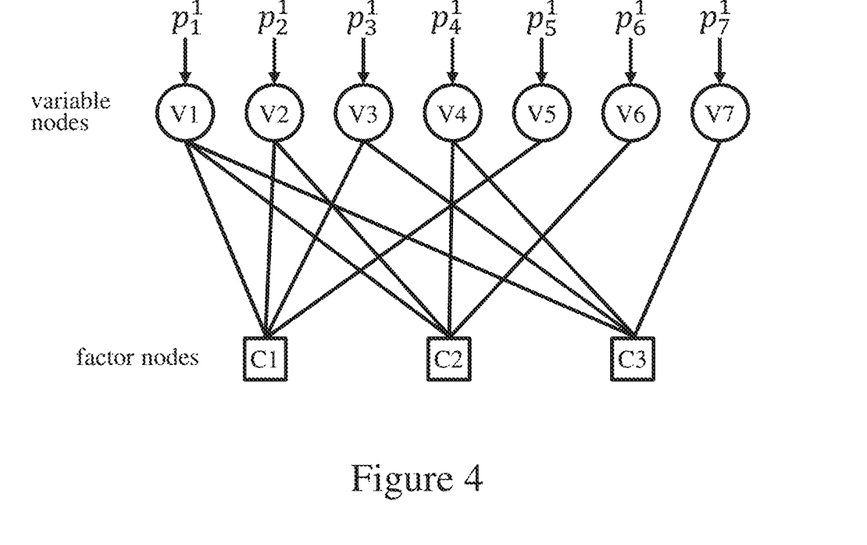
FIG. 4 shows a factor graph for an error-correction code decoding application.

The bipartite factor graph corresponding to the parity check matrix H is shown in FIG. 4. In this application, the random variables correspond to codeword symbols. Hence, the graph has seven variable nodes V1 to V7 corresponding to symbols $b_1$ to $b_7$. Since these variables are binary, the probability distribution of each variable is fully defined by either of the probabilities $p_n^0$ or $p_n^1$. In this example, $p_n^1$ is used whereby the initial symbol probabilities at variable nodes V1 to V7 represent the probabilities $p_1^1$ to $p_7^1$ that symbols $b_1$ to $b_7$, corresponding to samples $x_1$ to $x_7$ respectively, are bits of value 1. The factor graph has three factor nodes, here check nodes C1, C2 and C3 which implement the parity-check operations of the decoding algorithm. Edges in the graph interconnect variable nodes and check nodes as defined by the parity-check matrix H.

Figure 5:
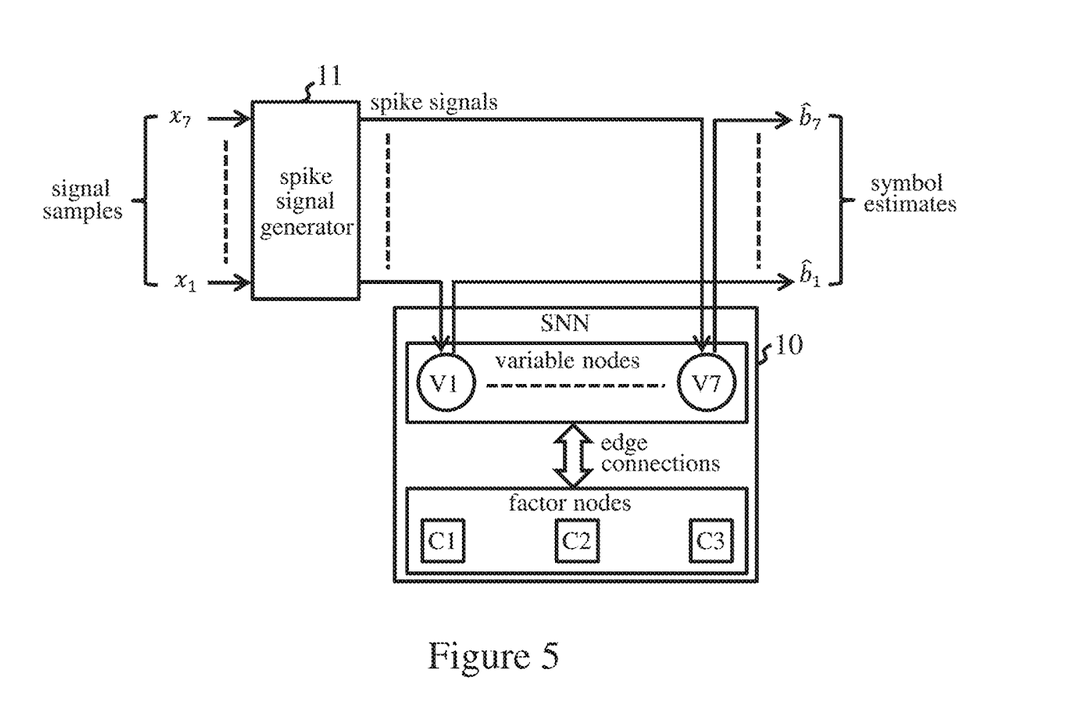
FIG. 5 is schematic representation of apparatus for implementing probability propagation in the decoding application.

The high-level structure of apparatus for implementing propagation of probability distributions, here $p_1^1$ to $p_7^1$, is shown in FIG. 5. The apparatus comprises an SNN 10 and a spike signal generator 11. In this application, SNN 10 has variable nodes V1 to V7 interconnected with check nodes C1 to C3 in accordance with the factor graph of FIG. 4. Each node comprises a set of neurons, described further below, which is configured to implement computational functionality of the node. Spike signal generator 11 receives the signal samples $x_1$ to $x_7$ corresponding to a transmitted codeword, and calculates the probabilities $p_1^1$ to $p_7^1$ for these samples via the equation given above. The spike signal generator then generates spike signals, in this case one for each symbol $b_1$ to $b_7$, encoding the probabilities $p_1^1$ to $p_7^1$ respectively. These probabilities are encoded in the rate and/or timing of spikes in the spike signals as described further below. The spike signals encoding $p_1^1$ to $p_7^1$ are supplied by signal generator 11 as inputs to SNN 10 at variable nodes V1 to V7 respectively. The probability distributions are then propagated via the rate and/or timing of spikes in signals propagated through the SNN. The propagation operation is performed iteratively here, and the variable nodes are adapted to output estimated symbol values, denoted by $\hat{b}_1$ to $\hat{b}_7$, for the codeword after propagation over each pass of the iterative operation.

In general, functionality of the various components of the propagation apparatus may be provided by logic implemented in hardware or software or a combination thereof. Such logic may be described in the general context of computer system-executable instructions, such as program modules, executed by a (general-purpose or special-purpose) programming apparatus. Generally, program modules may include routines, programs, objects, components, logic, data structures, and so on that perform particular tasks or implement particular abstract data types. For example, neuron functionality in SNN 10 may be implemented in software in some embodiments. Hardware implementations are preferred, however, and SNN 10 can be constructed using generally known circuit techniques to implement the functionality described.

Figure 6:
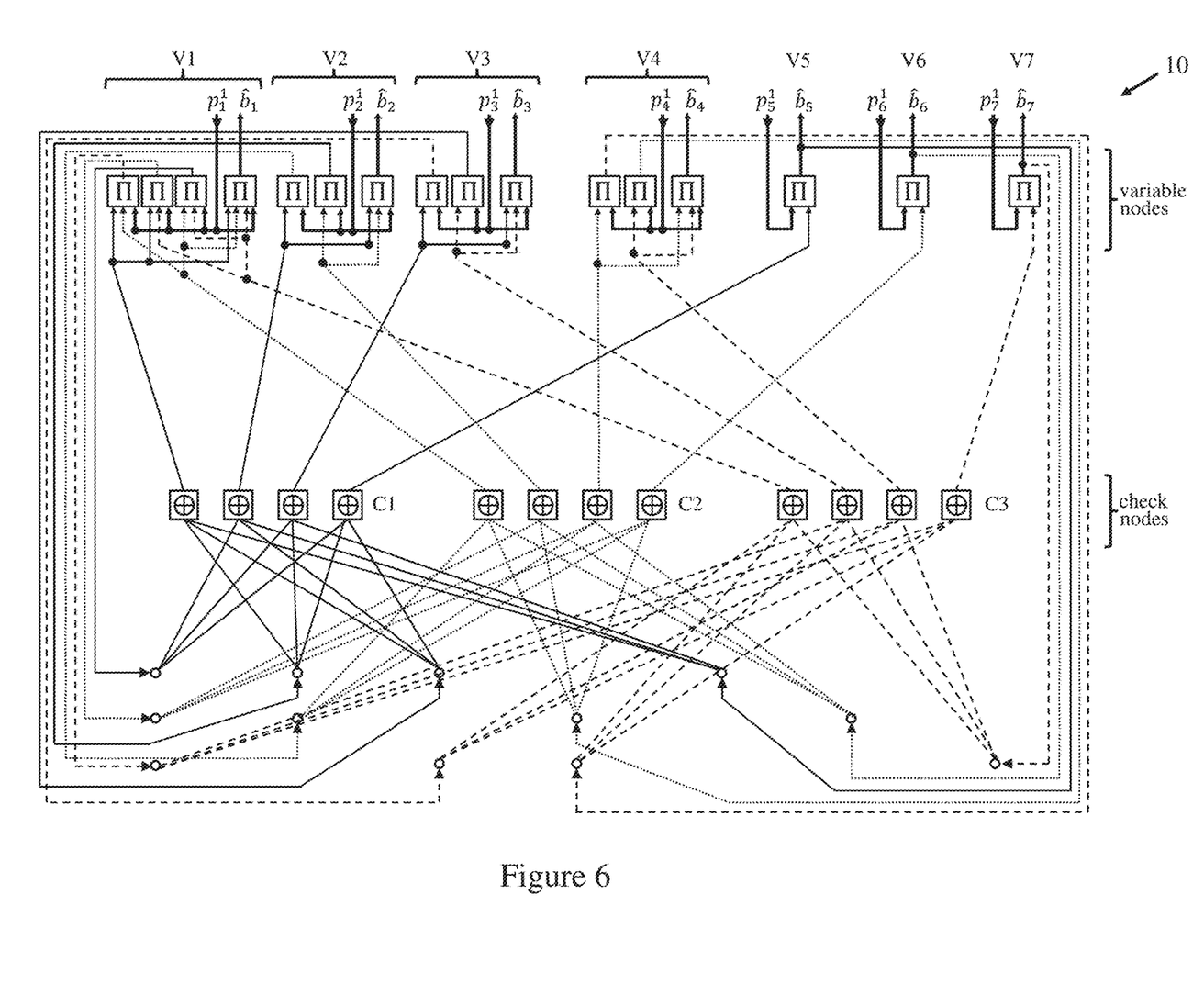
FIG. 6 illustrates structure of a spiking neural network in the apparatus of FIG. 5.

FIG. 6 illustrates more detailed structure of SNN 10. Each variable node V1 to V7 comprises one or more neurons, denoted by Π, as indicated. The number of Π-neurons implementing each variable node depends on the number of edges between that node and check nodes. Each Π-neuron is adapted to implement a majority rule function as explained below. Each check node C1 to C3 comprises neurons configured to implement an XOR function, denoted by ⊕ in the figure. Specifically, each check node comprises four neural networks each implementing the XOR operation, one for each of the four edges between that check node and variable nodes. Connections between check node C1 and its neighboring variable nodes V1, V2, V3 and V5 are indicated by solid lines in the figure. Connections between check node C2 and its neighboring variable nodes V1, V2, V4 and V6 are indicated by dotted lines. Connections between check node C3 and its neighboring variable nodes V1, V3, V4 and V7 are indicated by dashed lines.

In operation, the spike signals encoding probabilities $p_1^1$ to $p_7^1$ are supplied to the Π-neurons of nodes V1 to V7 respectively via inputs indicated in bold in the figure. In this initial pass, there are as yet no outputs from the check nodes to the variable nodes. Hence, the spike signals encoding $p_1^1$ to $o_7^1$ will be transmitted by the Π-neurons, providing the inputs to the SNN at the variable nodes which are transmitted to the check nodes. The spike signals are supplied to the XOR networks of the check nodes via the connections indicated in the figure. Each XOR network applies the XOR function to its input spike signals, and outputs the resulting spike signal to a variable node. Each XOR network of a check node thus computes one of the function-to-variable messages $\mu_{C \to V}(V)$, described earlier, to be transmitted by that check node to one of its neighboring variable nodes. The XOR output signals are received by Π-neurons at the variable nodes as indicated by connections in the figure. Each Π-neuron also receives the input spike signals encoding probabilities $p_1^1$ to $p_7^1$. (These spike signals are fired by spike generator 11 after delay $\delta t$ corresponding to the propagation time of the initial signals through the network back to the Π-neurons). In each variable node, one Π-neuron computes one of the variable-to-function messages $\mu_{V \to C}(V)$ to be transmitted by that variable node back to one of its connected check nodes. These Π-neuron output signals initiate the second pass of the propagation operation. One Π-neuron in each variable node also receives all signals from connected check nodes, along with the initial input spike signals. (For variable nodes V5 to V7 which are connected to only one check node, a single Π-neuron is sufficient. For the other variable nodes, an additional Π-neuron receives all check node output signals along with the initial input signal). The output signal of this Π-neuron in each variable node provides a symbol estimate, i.e. $\hat{b}_n=0$ or $\hat{b}_n=1$, for the codeword symbol corresponding to that variable node.

The second pass of the propagation operation proceeds as above based on the Π-neuron output signals after the first pass. Operation thus proceeds iteratively, with the output symbol estimates $\hat{b}_1$ to $\hat{b}_7$ being progressively refined in successive iterations. The propagation operation may be run for a predetermined number of iterations, or may proceed until symbol estimates reach a desired degree of certainty, e.g. until estimates satisfy the parity-check equation, or are unchanged over a defined number of iterations.

Figure 7:
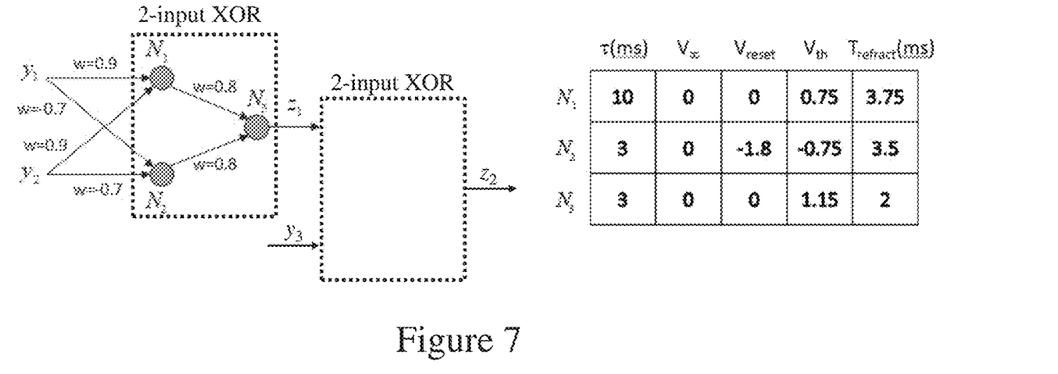
FIG. 7 indicates configuration of neurons in a factor node in one embodiment of the FIG. 6 network.

In a first embodiment of the FIG. 6 SNN, the spike signal generator 11 encodes the probabilities $p_1^1$ to $p_7^1$ via the spike rate (spike frequency) in the spike signals. The node neurons are also configured such that probabilities are propagated throughout the SNN via the spike rate in the propagated signals. FIG. 7 indicates neuron configuration in factor nodes C1 to C3 in this embodiment. The diagram on the left indicates the neural network structure for each XOR block of a factor node, and the table on the right indicates parameters for the individual neurons based on the neuron model described earlier. (These and similar parameters below are determined in generally known manner via a training operation for the neural network). Each 3-input XOR block of a check node is constructed from two identical 2-input XOR networks (one of which is shown in full in the figure) connected as shown. The first 2-input XOR network comprises two input neurons $N_1$ and $N_2$, receiving two of the XOR inputs (denoted here by $y_1$ and $y_2$), connected to an output neuron $N_3$. The output $z_1$ of neuron $N_3$ provides one input to the second XOR network whose second input is the third of the 3-input XOR input signals, denoted here by $y_3$. The output $z_2$ is the output signal of the 3-input XOR network.

Figure 8:
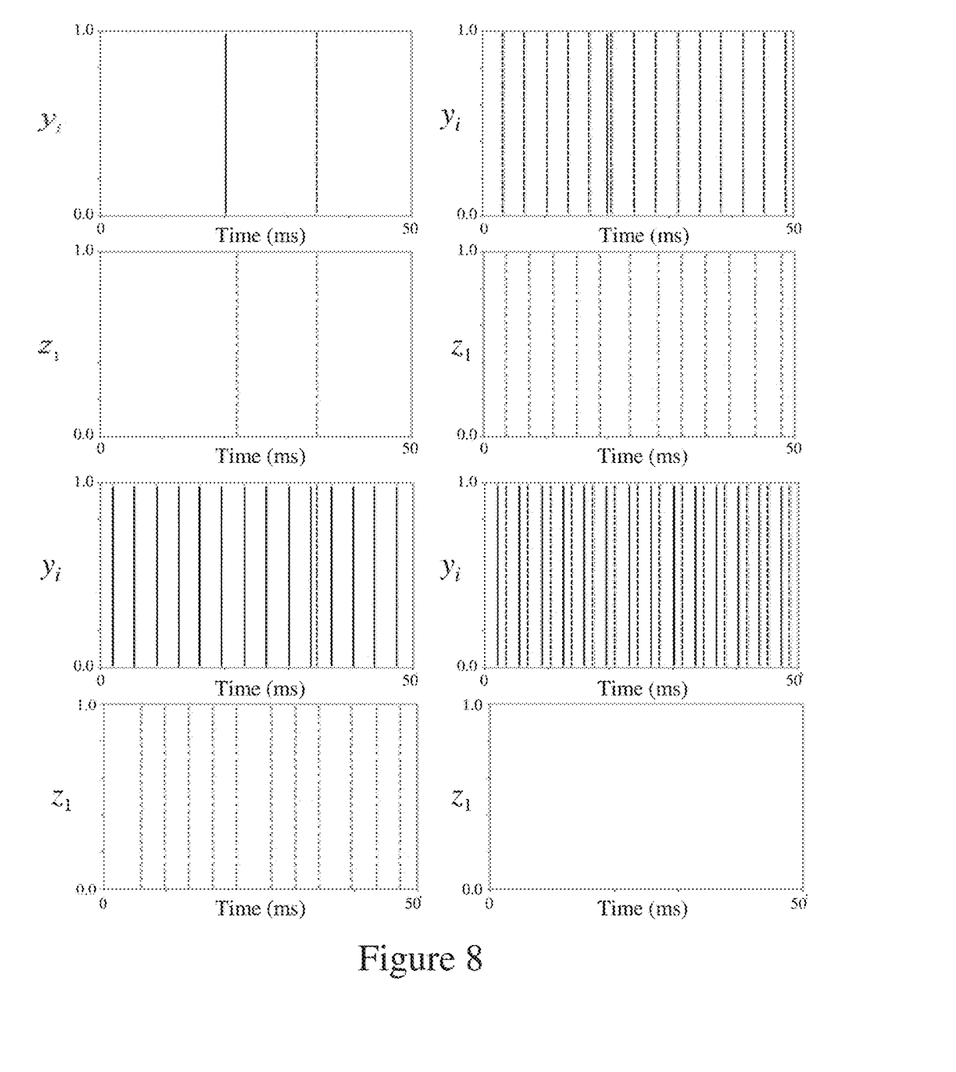
FIG. 8 illustrates operation of the neuron configuration of FIG. 7.

Operation of the FIG. 7 network can be understood from FIG. 8. This illustrates spike rate encoding in the two input signals $y_{i=1,2}$ and the output signal $z_1$ of the two-input XOR network shown in FIG. 7. Spikes are indicated by vertical lines in each case, with the two inputs $y_i$ being represented by solid and dotted lines respectively. In the upper left diagram, both inputs have a low spike rate, corresponding to low probability $p_n^1$, signifying $y_1=0$ and $y_2=0$. The output signal $z_1$ thus has a low spike rate, i.e. $z_1=0$, as indicated in the diagram below. In the upper right diagram, one input has a low spike rate and the other is high, e.g., $y_1=0$ and $y_2=1$. The output signal $z_1$ thus has a high spike rate, i.e. $z_1=1$, as indicated in the diagram below. The remaining input combinations are shown in the lower left- and right-hand diagrams, corresponding to $y_1=1$, $y_2=0$, $z_1=1$ on the left and $y_1=1$, $y_2=1$, $z_1=0$ on the right. The 2-input XOR operation is thus implemented as required. The three input XOR operation follows accordingly.

Figure 9:
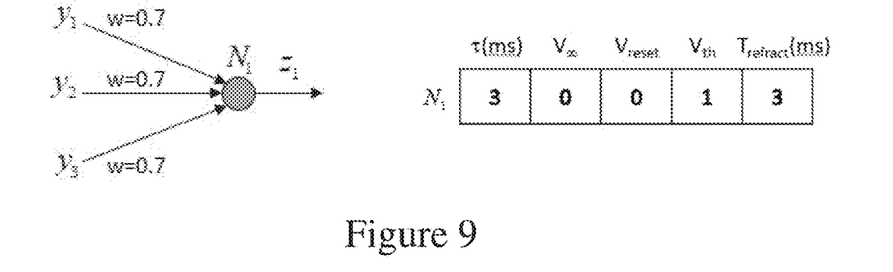
FIG. 9 indicates neuron configuration in a variable node of the FIG. 6 network.
Figure 10:
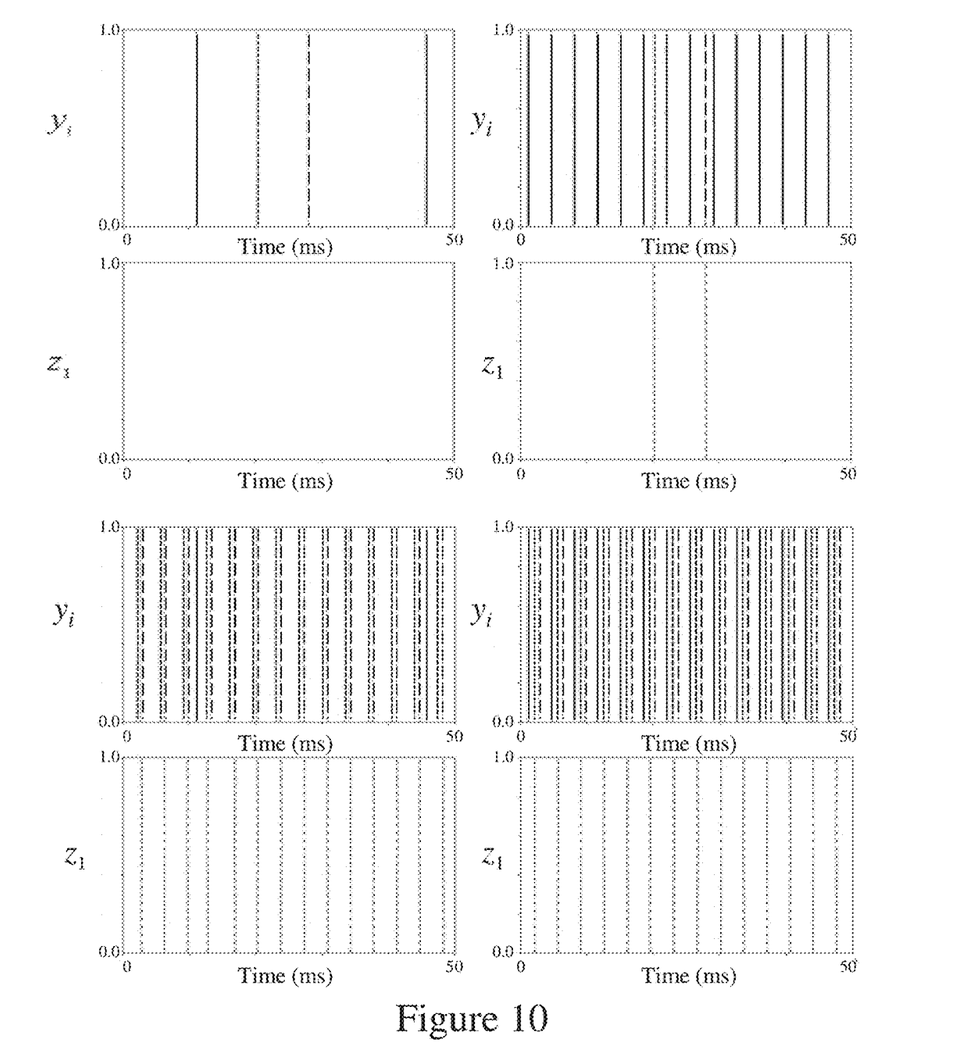
FIG. 10 illustrates operation of the neuron configuration of FIG. 9.

FIG. 9 indicates the configuration of each Π-neuron in variable nodes V1 to V7 in this embodiment. Each Π-neuron in FIG. 6 has from two to four inputs. Three-inputs $y_1$ to $y_3$ are shown in FIG. 9, but the operation described applies for any number of inputs. The Π-neuron $N_1$ fires a spike if its threshold potential $v_{th}$ is exceeded. This implements a majority rule function, whereby a high-frequency (i.e., high-probability of a symbol being equal to 1) output will be generated if more than half of the inputs are high-frequency (i.e., high-probability of a symbol being equal to 1) inputs. If exactly half of the inputs are high-frequency inputs, a high-frequency output will be generated with probability 0.5. FIG. 10 indicates the rate encoding in input and output signals as before, where spikes in the three inputs here are indicated by solid, dotted and dashed lines respectively. It can be seen that the output $z_1$ has a high spike rate, corresponding to high probability, if two or more of the inputs have a high spike rate.

The above provides a simple yet highly efficient implementation in which probabilities are encoded in spike rate throughout the propagation operation. The H-neuron which receives all inputs from check nodes indicates the output symbol estimates as $\hat{b}_n=1$ if output $z_1$ has a high spike rate and $\hat{b}_n=0$ if $z_1$ has a low spike rate.

Figure 11:
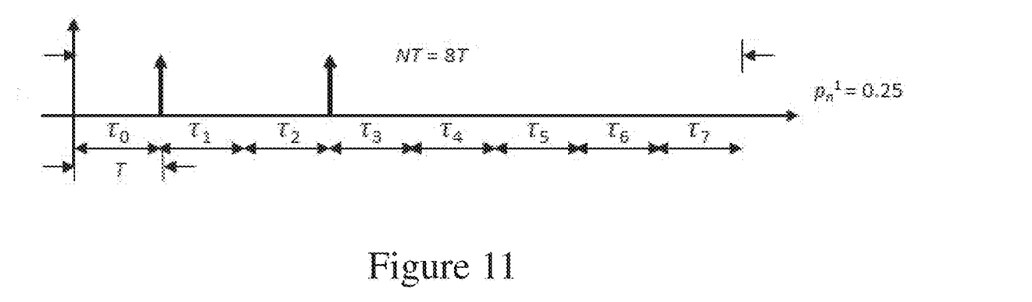
FIG. 11 illustrates probability encoding in input spike signals in a second embodiment of the FIG. 5 apparatus.

In a second embodiment of the FIG. 5 apparatus, spike signal generator 11 encodes the probabilities $p_1^1$ to $p_7^1$ via rate and timing of spikes in the spike signals. In particular, the probability $p_n^1$ that a channel output symbol is equal to 1 is encoded by a Bernoulli sequence as a random sequence of spikes within a sequence of N intervals of duration T, in which a spike is fired in the $i^{th}$ interval $\tau_i$, $i \in \{0, 1, \ldots, N-1\}$, at time t=iT, with probability $p_n^1$. This is illustrated in FIG. 11 for $p_n^1=0.25$ in an example with N=8.

Figure 12:
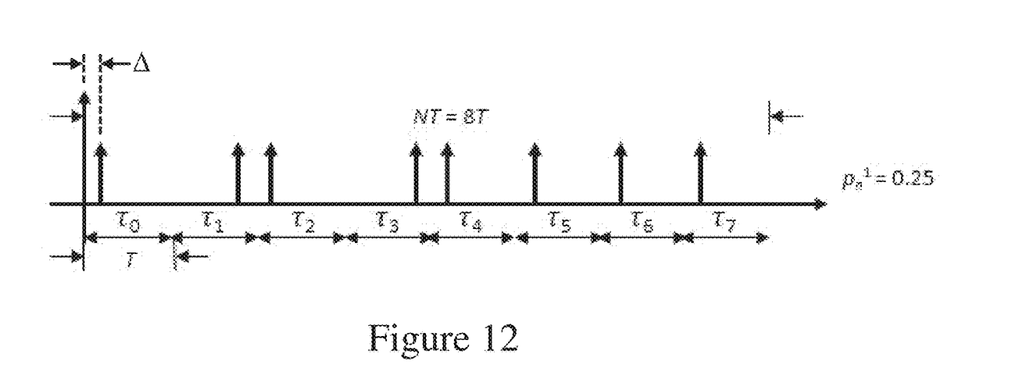
FIG. 12 illustrates probability encoding in spike signals input to factor nodes in the second embodiment.
Figure 13:
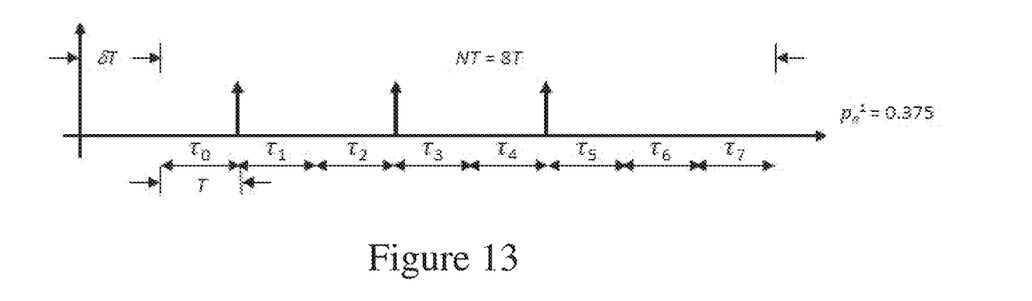
FIG. 13 illustrates probability encoding in spike signals at variable nodes after a first pass of probability propagation in the second embodiment.

Variable node neurons are implemented by Π-neurons as in the embodiment above, each Π-neuron firing a spike if its threshold potential is exceeded. Check node neurons are implemented by 3-input XOR networks, but these nodes operate with encoding via spike timing. In particular, in the input signals to the XOR networks, binary information is encoded in the $i^{th}$ interval via the timing at which a spike is fired. A bit 1 is encoded by firing a spike at time $t=(i+1)T-\Delta$, and a bit 0 is encoded by firing a spike at time $t=iT+\Delta$. This is illustrated in FIG. 12 for an input probability $p_n^1=0.25$. The output neuron of a 3-input XOR network is inhibited for a time interval $t_s$ ($\Delta < t_s < (T-\Delta)$) in each interval $\tau$ to suppress spikes corresponding to 0's in the XOR output signal. This suppression of "0-spikes" converts the spike encoding back to that used at Π-neurons of the variable nodes, where a spike is fired (to encode a 1) or not (to encode a 0). These converted signals are combined with the input spike signals at the variable nodes as before. FIG. 13 shows the resulting spike representation for a variable node output signal encoding probability $p_n^1=0.375$ after the first iteration.

Figure 14:
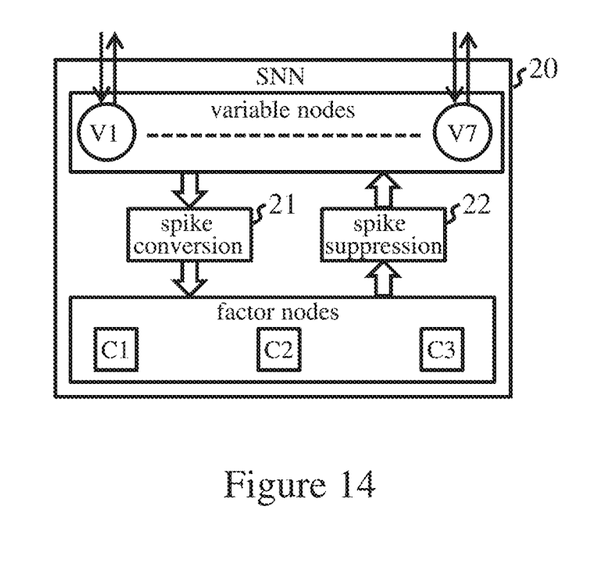
FIG. 14 indicates SNN structure in the second embodiment.

The different spike encoding mechanisms used at variable and check nodes in this embodiment can be accommodated by additional logic in the SNN as indicated in FIG. 14. The SNN 20 corresponds generally to that of FIG. 6. However, spike conversion logic 21 converts the spike representation in variable-to-check node signals to that used by the check nodes as detailed above. Logic 21 can be implemented in any convenient manner here and suitable implementations will be readily apparent to those skilled in the art. Conversion of the check node outputs back to the variable node spike representation can be performed here by spike suppression, as indicated at 22. As described above, this functionality can be implemented simply by inhibiting the output neuron of each XOR network for the time interval $t_s$ to suppress the 0-spikes in check node output signals.

Figure 15:
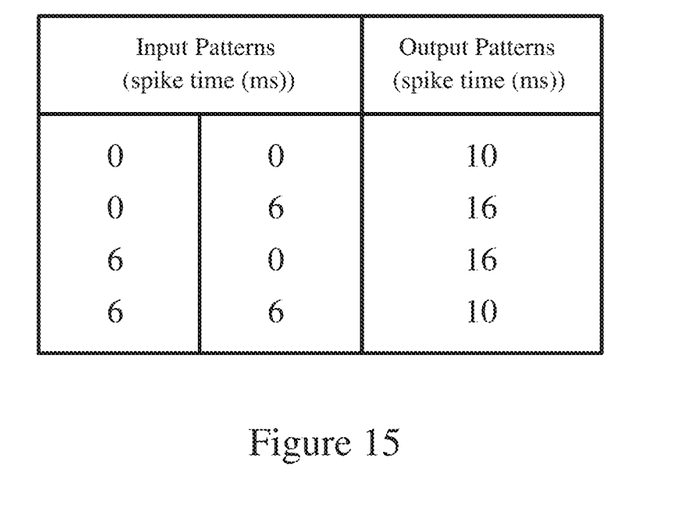
FIG. 15 indicates operation of neurons in a factor node in the second embodiment.

A 3-input XOR network for the check nodes of this embodiment can be implemented by cascading two 2-input XOR networks of the type detailed in Section 3.3 of "Spiking Neural Networks", S. M. Bohte, Ph.D. thesis, University Leiden (2003), ISBN 90-6734-167-3, and explained in the following. The 2-input XOR network consists of a network of delayed spiking neurons, with 16 available synaptic delays connecting two neurons. The network comprises three input neurons (2 coding neurons and 1 timing reference neuron), 5 hidden (i.e. intermediate-layer) neurons of which one inhibitory neuron generates only negative-sign post-synaptic potentials, and 1 output neuron. A spike from a pre-synaptic neuron generates 16 delayed spike-response functions. The sum of all spike-response functions from the pre-synaptic neurons generates the membrane-potential in the post-synaptic neuron. This is illustrated in FIG. 2.1 of the above reference. With only positive weights allowed, 16×3×5+16×5×1=320 individual weights are adjusted in a training operation to learn the XOR function using an error-back-propagation algorithm. This algorithm is detailed in Section 3.2 of the reference. In the resulting network, the input information and the result of the XOR operation are encoded in the timing of the input and output neuron pulses. For the above embodiment, a "0" is associated with an early firing time and a "1" with a late firing time. The table of FIG. 15 indicates the input-output relationship achieved by the XOR network in terms of the input/output spike times in milliseconds. In the input spike patterns, a "0" is associated with a spike time of 0 ms and a "1" with a time of 6 ms. In the output spike patterns, a "0" is associated with a spike time of 10 ms and a "1" with a time of 16 ms.

The use of spike-time encoding, as exemplified in the above embodiment, provides a powerful encoding technique for probability propagation at the expense of some additional implementation complexity. Accurate characterization of spike occurrence time is required throughout. For example, the delays δt through the variable nodes and check nodes are accurately characterized so that, at each iteration, the firing of the spike sequences representing the symbol probabilities $p_1^1$ to $p_7^1$ takes place concurrently with the firing of the XOR output neurons. Proper synchronization may be achieved by including timing reference neurons at the variable and check nodes, whereby network operation is synchronized with spike trains fired by the timing reference neurons.

While operation is described for binary random variables above, the SNN architecture can be readily extended to accommodate multivalued random variables. Multiple spike signals are then required to encode the probability distribution of each variable. In particular, for each possible value of each random variable, a spike signal encoding the probability of that value of the variable will be generated by spike signal generator 11. Multiple connections are then provided between variable nodes and check nodes to propagate these signals in the SNN, and multiple neural networks are provided at nodes to accommodate the computations for multiple probabilities. The fundamental operating principles are the same, however, and the functionality described above can be extended in a straightforward manner to accommodate multivalued variables in the SNN architecture.

In an exemplary implementation for multivalued random variables, a stochastic approach may be applied for probability encoding. Variables with $2^n$ possible values can be represented by binary vectors with n elements. Each random variable can be mapped to $2^n$ parallel signal lines connecting signal generator 11 to SNN 10. Each of these $2^n$ lines passes the probability of the random variable assuming the corresponding value, with the probability P being encoded in the number of 1's (i.e. spikes) transmitted over an interval of duration L*T. The 1's are distributed over the interval as follows. The probabilities are encoded in the L time slots by $2^n$ binary random sequences, with a total of L bits equal to 1. In each time slot only one bit is equal to 1, carrying a probability of 1/L. (As an alternative, the 1's can be transmitted as events generated from a Poisson process with a mean rate R which is proportional to the probability P). Check node functionality can be implemented by logic with j,j≥2, $2^n$-valued input random variables and one $2^m$-valued output random variable. Variable node functionality can be implemented by majority vote on the number of 1's received for each value of the k, k≥2, $2^m$-valued input variables, with random selection to break ties. Such an implementation may be employed, for example, in stochastic decoding of multivalued LDPC (low-density parity-check) codes with symbols from a Galois field GF(q), with $q=2^n=2^m$.

Many changes and modifications can of course be made to the exemplary embodiments described. For example, other techniques can be envisaged for encoding probabilities in spike sequences, and other combinations of spike rate- and/or time-based encoding may be employed at variable and check nodes in other embodiments. Also, while a decoding application is detailed above, embodiments of the invention may be employed in any application in which probability propagation of random variables is performed for statistical inference. Examples include image recognition, machine learning, dataset analysis, treatment analysis for genetic disease, speech recognition, and belief propagation applications generally.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for implementing propagation of probability distributions of random variables over a factor graph, the method comprising:
providing a spiking neural network, having variable nodes interconnected with factor nodes, corresponding to the factor graph, wherein each of said nodes comprises a set of neurons configured to implement computational functionality of that node;
generating, for each of a set of the random variables, at least one spike signal in which the probability of a possible value of that variable is encoded via the occurrence of spikes in the spike signal; and
supplying the spike signals for said set of random variables as inputs to the neural network at respective variable nodes;
whereby said probability distributions are propagated via the occurrence of spikes in signals propagated through the neural network.

2. The method as claimed in claim 1 including generating each said spike signal such that said probability is encoded via at least one of the rate of occurrence and the time of occurrence of spikes in the spike signal.

3. The method as claimed in claim 2 wherein the neurons of said nodes are configured such that said probability distributions are propagated via at least one of the rate of occurrence and the time of occurrence of spikes in signals propagated through the neural network.

4. The method as claimed in claim 3 including generating each said spike signal such that said probability is encoded via the rate of occurrence of spikes in the spike signal, wherein the neurons of said nodes are configured such that said probability distributions are propagated via the rate of occurrence of spikes in signals propagated through the neural network.

5. The method as claimed in claim 1 wherein the random variables are binary variables, the method including generating, for each random variable of said set, a single spike signal encoding the probability of a predetermined one of the binary values of the variable.

6. The method as claimed in claim 1 wherein the random variables are multivalued variables, the method including generating, for each possible value of each random variable of said set, a spike signal encoding the probability of that value of the variable.

7. A method for detecting error-correction codewords, in a signal sampled at a channel output, by propagating probability distributions of codeword symbols corresponding to respective signal samples over a factor graph, the method comprising:

provide a spiking neural network, having variable nodes interconnected with factor nodes, corresponding to a bipartite factor graph defined by a decoding algorithm of the error-correction code, wherein each of said nodes comprises a set of neurons configured to implement computational functionality of that node;

generating, for each signal sample corresponding to a symbol of a codeword, at least one spike signal in which the probability of a possible symbol value for that sample is encoded via the occurrence of spikes in the spike signal; and supplying the spike signals corresponding to the symbols of a codeword as inputs to the neural network at respective variable nodes;

whereby said probability distributions are propagated via the occurrence of spikes in signals propagated through the neural network and said variable nodes output estimated symbol values for the codeword after propagation.

8. The method as claimed in claim 7 including generating each said spike signal such that said probability is encoded via at least one of the rate of occurrence and the time of occurrence of spikes in the spike signal.

9. The method as claimed in claim 8 wherein the neurons of said nodes are configured such that said probability distributions are propagated via at least one of the rate of occurrence and the time of occurrence of spikes in signals propagated through the neural network.

10. The method as claimed in claim 9 including generating each said spike signal such that said probability is encoded via the rate of occurrence of spikes in the spike signal, wherein the neurons of said nodes are configured such that said probability distributions are propagated via the rate of occurrence of spikes in signals propagated through the neural network.

11. The method as claimed in claim 7 wherein the codeword symbols are binary symbols, the method including generating, for each signal sample, a single spike signal encoding the probability of a predetermined one of the binary symbol values.

12. The method as claimed in claim 7 wherein the codeword symbols are multivalued symbols, the method including generating, for each possible symbol value of each signal sample, a spike signal encoding the probability of that symbol value for the sample.

13. An apparatus for implementing propagation of probability distributions of random variables over a factor graph, the apparatus comprising:

a spiking neural network, having variable nodes interconnected with factor nodes, corresponding to the factor graph, wherein each of said nodes comprises a set of neurons configured to implement computational functionality of that node; and a spike signal generator adapted to generate, for each of a set of the random variables, at least one spike signal in which the probability of a possible value of that variable is encoded via the occurrence of spikes in the spike signal, and to supply the spike signals for said set of random variables as inputs to the neural network at respective variable nodes;

wherein said probability distributions are propagated via the occurrence of spikes in signals propagated through the neural network.

14. The apparatus as claimed in claim 13 wherein the spike signal generator is adapted to generate each said spike signal such that said probability is encoded via at least one of the rate of occurrence and the time of occurrence of spikes in the spike signal.

15. The apparatus as claimed in claim 14 wherein the neurons of said nodes are configured such that said probability distributions are propagated via at least one of the rate of occurrence and the time of occurrence of spikes in signals propagated through the neural network.

16. The apparatus as claimed in claim 15 wherein the spike signal generator is adapted to generate each said spike signal such that said probability is encoded via the rate of occurrence of spikes in the spike signal, and wherein the neurons of said nodes are configured such that said probability distributions are propagated via the rate of occurrence of spikes in signals propagated through the neural network.

17. The apparatus as claimed in claim 13 wherein the random variables are binary variables, and wherein the spike signal generator is adapted to generate, for each random variable of said set, a single spike signal encoding the probability of a predetermined one of the binary values of the variable.

18. The apparatus as claimed in claim 13 wherein the random variables are multivalued variables, and wherein the spike signal generator is adapted to generate, for each possible value of each random variable of said set, a spike signal encoding the probability of that value of the variable.

19. An apparatus for detecting error-correction codewords, in a signal sampled at a channel output, by propagating probability distributions of codeword symbols corresponding to respective signal samples over a factor graph, the apparatus comprising:

a spiking neural network, having variable nodes interconnected with factor nodes, corresponding to a bipartite factor graph defined by a decoding algorithm of the error-correction code, wherein each of said nodes comprises a set of neurons configured to implement computational functionality of that node; and a spike signal generator adapted to generate, for each signal sample corresponding to a symbol of a codeword, at least one spike signal in which the probability of a possible symbol value for that sample is encoded via the occurrence of spikes in the spike signal;

wherein said probability distributions are propagated via the occurrence of spikes in signals propagated through the neural network and said variable nodes are adapted to output estimated symbol values for the codeword after propagation.

20. The apparatus as claimed in claim 19 wherein each neuron of a variable node is adapted to implement a majority rule function.

21. The apparatus as claimed in claim 19 wherein each factor node comprises neurons configured to implement an XOR function.

22. The apparatus as claimed in claim 19 wherein the spike signal generator is adapted to generate each said spike signal such that said probability is encoded via at least one of the rate of occurrence and the time of occurrence of spikes in the spike signal.

23. The apparatus as claimed in claim 22 wherein the neurons of said nodes are configured such that said probability distributions are propagated via at least one of the rate of occurrence and the time of occurrence of spikes in signals propagated through the neural network.

24. The apparatus as claimed in claim 23 wherein:
the spike signal generator is adapted to generate each said spike signal such that said probability is encoded via the rate of occurrence of spikes in the spike signal; and
the neurons of said nodes are configured such that said probability distributions are propagated via the rate of occurrence of spikes in signals propagated through the neural network.

25. A computer program product comprising a computer readable storage medium having program instructions embodied therein, the program instructions being executable by processing apparatus to cause the processing apparatus to perform propagation of probability distributions of random variables over a factor graph by:
implementing a spiking neural network, having variable nodes interconnected with factor nodes, corresponding to the factor graph, wherein each of said nodes comprises a set of neurons configured to implement computational functionality of that node;
generating, for each of a set of the random variables, at least one spike signal in which the probability of a possible value of that variable is encoded via the occurrence of spikes in the spike signal; and
supplying the spike signals for said set of random variables as inputs to the neural network at respective variable nodes;
whereby said probability distributions are propagated via the occurrence of spikes in signals propagated through the neural network.

* * * * *